Figure 1A:
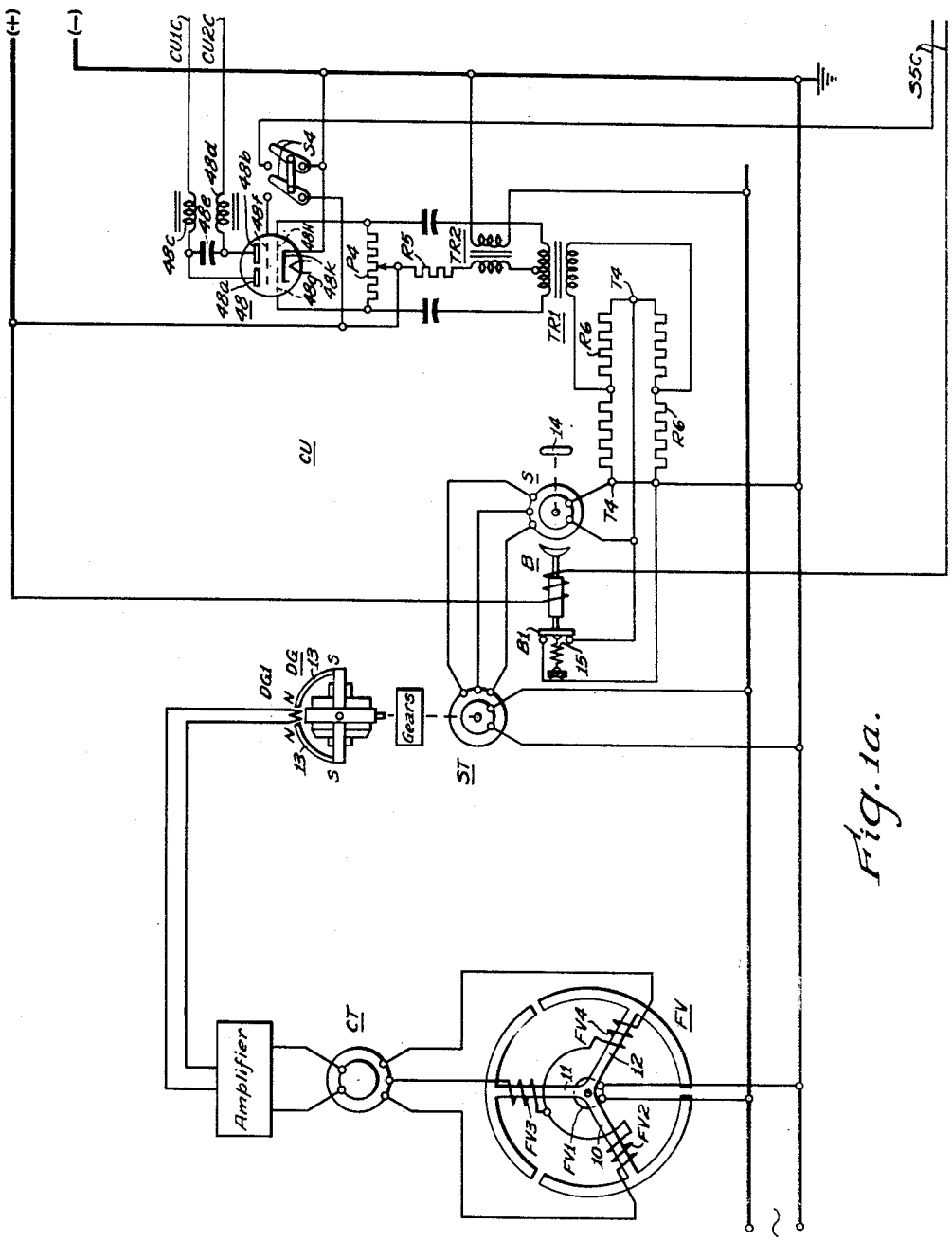

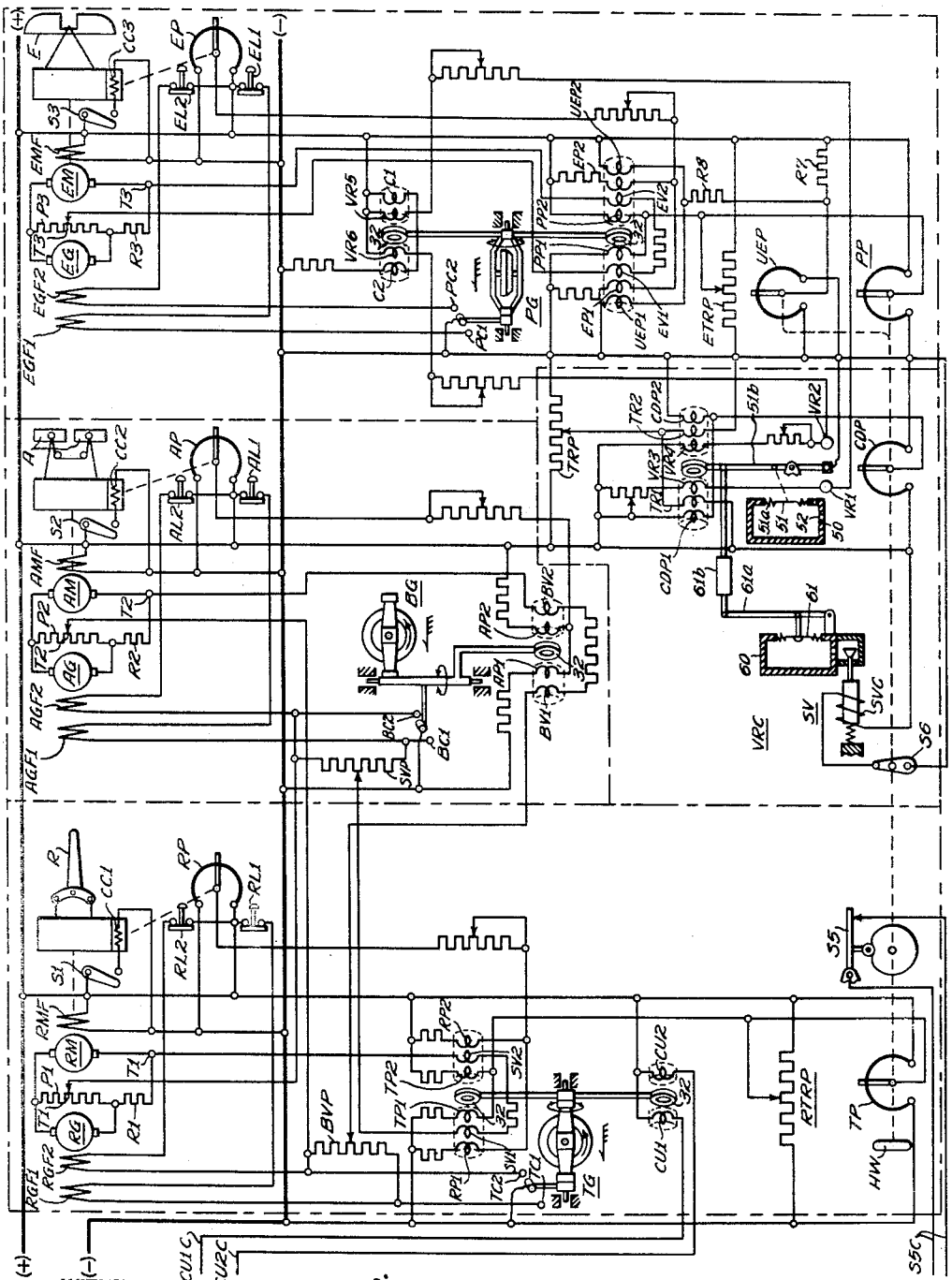

Patented Dec. 22, 1953

2,663,838

UNITED STATES PATENT OFFICE 2,663,838

GYROSCOPE SYSTEM FOR DIRIGIBLE CRAFT

Ivar M. Holliday, George R. Douglas, and Clinton R. Hanna, Pittsburgh, Pa., assignors to Westinghouse Electric Corporation, East Pittsburgh, Pa., a corporation of Pennsylvania Application November 14, 1947, Serial No. 785,984

25 Claims. (Cl. 318—489)

This invention relates generally to systems of control and more particularly to control systems applicable in the control of conveyances operable in space.

The present invention is herein illustrated and described as applied in the control of a conventional aircraft utilizing rudders, elevators and ailerons, respectively, for controlling the craft directionally, longitudinally and laterally. However, it will be appreciated that the system herein disclosed may be applied to other types of craft utilizing means other than the control surfaces mentioned for effecting maneuverability.

In certain of its aspects this invention is related to a copending application of C. R. Hanna, Serial No. 785,983, now Patent No. 2,638,288, filed on the same date as this application, entitled Control Systems and assigned to the same assignee as this invention. The copending application of C. R. Hanna is directed to an automatic pilot for aircraft which is controlled by three velocity type gyroscopes, each of which is disposed on the aircraft to respond to rates of motion of the craft about one of the three principal axes of control so that each of the rudders, ailerons and elevators of the craft are controlled in dependence of velocity errors about the corresponding control axis. Additionally the control section of the system for each of the rudders, ailerons and elevators are so interrelated as to afford coordination of control surface movement for the purpose of maintaining the craft in equilibrium in various attitudes of flight and the entire system is under the control of a suitable piloting means manipulatable by the human pilot.

The velocity type gyroscopes are highly sensitive, and, hence, respond to very low angular rates of motion of the craft about its control axes, producing a control which anticipates impending changes in position and minimizes excursions of the craft in unwanted directions. But the velocity type of gyroscope in itself is insensitive to position errors and although the gyroscopes have a very low threshold of response, so that appreciable position errors as a rule accumulate only over relatively long periods of time, it is usually desirable that a control of this type shall have a position sense affording corrections also in dependence of angular errors in position.

To this end in the above-mentioned system of the identified copending application suitable means are provided to impart directivity to the three velocity type gyroscopes affording position references for the gyroscopes in yaw, roll and pitch of the craft and it is to a particular way of imparting a directional sense in azimuth that the present invention is directed.

Accordingly, it is one object of this invention to provide a system of control for a body operable in space which is simple with respect to operational requirements and positive in operation.

Another object of this invention is to provide a system of control for a body operable in space in which a control of the body in yaw both in dependence of yaw velocity and position is had.

A further object of this invention is to provide a system of control of the character referred to in which the position control is made sufficiently low that marked corrections in dependence of the position control do not occur.

A specific object of this invention is to provide a control system for a body operable in space having a velocity sense for detecting angular rates of the body about given control axes in which a course control unit sensitive to position errors of the body in azimuth supplements the velocity sense in azimuth.

Further to the preceding object it is also an object of this invention to provide means for effectively disconnecting the course control unit from the control system during the execution of maneuvers by the human pilot.

The foregoing statements are illustrative of the various aims and objects of this invention. Other objects and advantages will become apparent upon a study of the following descriptive disclosure when considered in conjunction with the accompanying drawings, in which:

Figures 1a and 1b together illustrate a control system embodying the principles of this invention.

The system illustrated in the drawings embodies the rate gyroscopes previously mentioned. One, a turn rate gyroscope TG controls a servo system including the rudder generator RG and the rudder motor RM which drives the rudder R of the aircraft. The second, a bank or roll rate gyroscope controls a servo system including the aileron generator AG and aileron motor AM which drives the ailerons A; and the third, a pitch rate gyroscope controls a servo system including the elevator generator EG and the elevator motor EM which drives the elevators E. Each gyroscope is oriented in the aircraft to respond to the rate of motion thereof about the corresponding control axis, the direction of flight being indicated by the arrow adjacent each gyroscope and the gyroscopes appearing as viewed from the side of the aircraft, that is, in side elevation.

As illustrated, each gyroscope has freedom for gyroscopic response about a single axis, otherwise the gyroscope is secured to the aircraft. Thus it will be observed that the turn gyroscope is sensitive only to angular motion about the turn axis of the aircraft, the turn axis lying in the plane of the drawing and being perpendicular to the axis about which the turn gyroscope is pivoted, which latter axis constitutes the output or precession axis of the turn gyroscope. The pitch gyroscope PG is similarly disposed, its output or precessoin axis being perpendicular to the pitch axis of the aircraft which is a line perpendicular to the plane of the drawing. The same applies to the bank gyroscope BG having its axis of freedom disposed at a right angle to the roll or bank axis of the aircraft which is a horizontal line in the plane of the drawing. In each case it will be observed that a rate of motion of the aircraft about any one of the turn, roll or pitch axes, applies a torque to the corresponding rate gyroscope tending to angularly displace the spin axis thereof. Accordingly, each gyroscope, having a degree of angular freedom about an output axis at right angles to the axis of the applied torque, produces an output torque representative of the input velocity and the output torque is herein utilized to produce suitable control quantities for operating the associated servo system.

There are several ways in which the gyroscope output torques may be utilized to produce electrical quantities. For instance, the torque may be applied through a mechanical linkage to a carbon pile unit or other type of variable resistance unit to control the resistance thereof. The present embodiment utilizes a contact set comprising a pair of opposed stationary contacts TC1 and TC2 having a movable contact secured to the gyroscope radially of the output axis thereof, disposed therebetween. Thus, in the case of the turn gyroscope, precessional motion selectively engages the movable contact with either of contacts TC1 or TC2 which are, respectively, connected in series with one of a pair of differentially related field windings RGF1 and RGF2 of the rudder generator RG. The circuit for the field RGF1 extends from the positive conductor (+) through limit switch RL1 controlled by the rudder potentiometer RP, through the field RGF1 to contact TC1 and thence to the movable contact and the negative conductor (−). Similarly, the circuit for field RGF1 extends from the positive conductor (+) through limit switch RL2 actuated by the rudder potentiometer RP, through field RGF2 to contact TC2 and thence to the movable contact and the negative conductor (−). The bank and pitch gyroscope contact circuits are the same as that of the turn gyroscope, aileron generator field AGF1 being connected in series with limit switch AL1 actuated by the aileron potentiometer AP and bank contact set BC1 across the power supply and field AGF2 being connected in series with limit switch AL2 and bank contact set BC2 across the power supply. Similarly, elevator generator field EGF1 is connected in series with limit switch EL1 actuated by elevator potentiometer EP and the pitch contact set PC1 and field EGF2 is in series with limit switch EL2 and pitch contact set PC2, both series circuits being connected across the power supply.

The function of the gyroscope contacts in controlling the excitation of the field circuits of the generators is not simply that of making and braking the circuit to the selected field but also that of controlling the current magnitudes in these circuits. This is accomplished by controlling the contacts so that hovering operation obtains in dependence of gyroscope output torques, suitable electromagnetic biases about the output axis of each gyroscope, and a degree of dynamic unbalance in the rotating system of the respective gyroscopes. By this means average currents are caused to flow in the field circuits corresponding to the detected error velocity about the corresponding control axis of the aircraft or corresponding to a set in turn rate at the handwheel HW.

The mentioned electromagnetic biases are produced by sets of electromagnets having armatures secured to the respective gyroscopes radially of their output axes. The specific structure of the electromagnets is not illustrated but reference may be had to the above-mentioned application of C. R. Hanna for these details. Generally, the electromagnets are designed with overlapping core and armatures so that appreciable changes in airgaps with armature movement do not occur over the limited range of armature motion so that the magnet force is independent of the armature position with respect to the magnet core, minimizing negative stiffness. Each magnet comprises a cylindrical core (not shown) having one extremity thereof projecting beyond the coil or coils wound thereabout. In the magnet system shown in the drawings, the cores are disposed in opposed relation and an annulus 32 of magnetic material secured to the associated gyroscope as previously described surrounds the core structures at the airgap formed between the confronting extremities of the cores. The axial length of the armature is sufficient that overlapping of the cores thereby exists throughout the limited range of armature motion.

The electromagnetic biases are produced by feedback voltages and control voltages applied to the respective coils of the magnets. The precessional response of each gyroscope is damped by a feedback voltage representative of the velocity of operation of the motor of the corresponding servo system. To this end, each motor is connected as one leg in a bridge circuit which is balanced against the IR drop of the motor armature. Thus when the motors drive the corresponding control surfaces to equilibrium position and stop, the currents circulating in the bridge circuits are balanced and the output voltage of each bridge is zero. However, during rotation the back E. M. F. of the respective motors increases the apparent armature resistance unbalancing the bridge circuit and producing an output voltage. Inasmuch as the motor fields RMF, AMF and EMF for the rudder motor, the aileron motor and the elevator motor are maintained at constant voltage across the power supply, the back E. M. F. varies in magnitude and direction with the motor speed and direction of rotation, producing a velocity voltage across the output terminals of each bridge circuit. The bridge circuit for the rudder motor includes a potentiometer P1, of which the tapped portions form adjacent legs and the remaining adjacent legs are formed by the resistor R1 and the armature winding of the rudder motor. Generator RG is connected across potentiometer P1, the extremities of which form the bridge circuit input terminals while terminals T1 formed by the tap of potentiometer P1 and the point between resistor R1 and the motor armature winding constitute the output terminals. The armature winding of aileron motor AM likewise forms one leg of a bridge circuit energized by generator AG and including a potentiometer P2 and a resistor R2, the output terminals being designated T2. Similarly, the armature winding of the elevator motor EM forms one leg of the bridge including potentiometer P3 and resistor R3 which is energized by generator EG and has for its output terminals the terminals T3. In each instance, the velocity voltage taken from the respective bridge circuits is fed back in a negative sense, that is the electromagnetic bias resulting from the velocity feedback voltage opposes the precessional response of the corresponding gyroscope.

A second feedback voltage is taken from the potentiometers RP, AP and EP, the movable taps of which are driven by the corresponding servo-system through electromagnetically operated clutches having coils CC1, CC2 and CC3 which are respectively energized from the power supply upon closure of switches S1, S2 and S3. Since the potentiometers are each actuated by a motor driving a control surface of the aircraft, the position of each movable tap and hence the tapped voltage corresponds to the position of the associated control surface. Thus the response of each gyroscope is also controlled in dependence of control surface position.

In order to obtain coordination of control surface movement during the execution of turn, the turn and bank gyroscopes TG and BG are additionally biased by the voltages taken, respectively, from a skid voltage potentiometer SVP, and a bank voltage potentiometer BVP, which are respectively connected in the field circuits of the aileron and rudder generators to be energized in dependence of the currents circulating therein when a set of the associated gyroscope's contacts is closed. For instance, regarding the skid voltage potentiometer SVP, when the contact BC1 is engaged by the movable contact actuated by gyroscope BG to energize field AGF1, a circuit for energizing skid voltage potentiometer SVP is completed beginning with the positive field AGF2, potentiometer SVP, contact BC1 and the movable contact engaged therewith to the negative conductor —. Engagement of the movable contact with contact BC2 energizes the potentiometer SVP in a reverse direction in a circuit including the generator field AGF1 and limit switch AL1. Analogous considerations apply to the bank voltage potentiometer BVP. Thus upon the operation of either of the bank or turn gyroscopes to control the associated control surface, the other gyroscope is biased in a direction to effect coordinated application of its control surface.

The turn and pitch gyroscopes are each additionally biased by voltages obtained from a potentiometer controlled by handwheel HW under the control of the pilot. In the rudder section of the system the potentiometer is designated TP while in the elevator section the potentiometer is designated UEP. These potentiometers are controlled by rotational motion of the handwheel, the turn potentiometer TP producing voltages of reversed polarity upon motion of the movable tap from one side to the other of mid position while the up-elevator potentiometer UEP produces unidirectional voltages on either side of its mid point position. Thus the biasing effect on the pitch gyroscope is unidirectional to produce up-elevator for either direction of rotation of the handwheel and bank of the aircraft to compensate for the reduction in loss of horizontal lifting surface of the main wing during banking, by increasing the angle of attack thereof. Additionally it has been found that the required amount of up-elevator varies substantially as the square of the angle of bank. Thus by applying suitable biasing effects to the electromagnets of the turn and bank gyroscopes to obtain linear response, the application of a square law bias to the pitch gyroscope produces the required degree of up-elevator application for the turn rate set in at the handwheel. In the present instance, the square law bias is obtained by utilizing a potentiometer UEP of sufficiently high ohmic value with respect to the resistance of the coils to which it is connected that a flat response over the middle or neutral range of the potentiometer obtains producing coil biasing voltages approximating a square law.

The pitch rate gyroscope is also biased by voltages taken from the pitch potentiometer PP. This potentiometer is actuated by push-pull motion of the handwheel affording reversed polarity biasing voltages when the movable tap is moved to opposite sides of neutral position, dives and climbs being executed by push-pull motion of the handwheel.

Directivity is imparted to all three gyroscopes. In the case of the bank gyroscope this is accomplished by making the gyroscope pendulous about its vertical output axis as illustrated. Thus this gyroscope in addition to responding to rates of motion about the roll axis is also sensitive to lateral acceleration and gravity, tending to assume a position about the vertical output axis corresponding to the resultant of these two quantities. As a consequence the reference position for which this gyroscope initiates rolling motion of the craft corresponds to the proper angle of bank for the actual turn velocity of the craft.

In the case of the pitch gyroscope directivity is obtained from the vertical rate control VRC, which produces biasing voltages in dependence of the rate of change of altitude and actual displacements in altitude. The vertical rate control includes a structure 50 having an opening therein forming a chamber which is sealed by a diaphragm 51 supported by a flexible annulus 51a. A small orifice 52 affords communication of the chamber with the atmosphere and diaphragm 51 is, therefore, displaced to the left or right with a force depending upon the rate of movement of the assembly vertically in the atmosphere. Diaphragm 51 is connected with pivoted arm 51b carrying a movable contact at its lower extremity and an armature of an electromagnet assembly at its upper extremity. The movable contact is disposed between a set of stationary contacts VR1 and VR2 which under the influence of the biasing control of the electromagnet associated therewith are caused to hover during operation. The vertical position reference is provided by the structure including the chamber 60 sealed by flexible diaphragm assembly 61, the motion of which is transmitted to arm 51b by link system 61a including a loaded spring assembly 61b and thus also influences contact operation.

The vertical rate control electromagnet assembly is energized by a dive and climb potentiometer CDP actuated by push-pull motion of handwheel HW. This potentiometer is connected in a bridge circuit with the pair of coils CDP1 and CDP2 in which the tapped portions of the potentiometer form one pair of adjacent legs and coils CDP1 and CDP2 form the remaining pair of adjacent legs. The bridge circuit is connected across the positive and negative conductors and the movable tap of the potentiometer CDP is connected between the coils. Thus motion of the potentiometer tap to either side of center position correspondingly unbalances the coil currents and the armature is biased accordingly to cause engagement of the movable contact with one or the other of contacts VR1 and VR2. Contacts VR1 and VR2 are respectively connected in series with coils VR3 and VR4 of the vertical rate electromagnet. The arrangement is such that closure of a contact energizes the corresponding coil tending to open the contact producing a hovering contact motion in which the electromagnetic biases balance the mechanical biases on arm 51b. The remaining pair of coils TR1 and TR2 form adjacent legs of a bridge including the trim potentiometer TRP which is adjustable to compensate off center conditions. During periods of climbing and diving of the aircraft initiated at the handwheel switch S6 operated by push-pull handwheel motion energizes solenoid valve SV which opens and provides communication of chamber 60 with the atmosphere.

In the case of the turn gyroscope directivity is obtained from the course control unit CU which will be described in detail hereinafter. This unit produces biasing voltages in dependence of the error in heading of the aircraft.

Summing up the foregoing electromagnetic biases on the individual gyroscopes, the turn rate gyroscope electromagnet assembly is controlled by a rudder motor velocity voltage, a rudder position voltage, a skid voltage, a piloting voltage from the turn potentiometer and a course error voltage.

The bank rate gyroscope electromagnet assembly is controlled by an aileron motor velocity voltage, an aileron position voltage and a bank voltage.

The pitch rate gyroscope electromagnet assembly is controlled by an elevator motor velocity voltage, an elevator position voltage, a piloting voltage from the up-elevator potentiometer UEP, a piloting voltage from the pitch potentiometer PP and a combined vertical rate and vertical position voltage.

These biasing voltages for the three gyroscopes are applied in any operating order and in various magnitudes depending upon the control requirements of the specific operating condition and the circuit connections are as follows:

Considering the turn gyroscope electromagnet system the velocity feedback voltage taken from terminals T1 at the movable tap of potentiometer P1 through a portion of the skid voltage potentiometer SVP to the tap thereof through coils SV1 and SV2 to the other terminal T1, these voltages produce opposed torque about the gyroscope output axis. The rudder position feedback voltage is applied by the connection of the rudder potentiometer RP in a bridge circuit with coils RP1 and RP2 so that movement of the tap of the rudder potentiometer unbalances the coil currents. The piloting voltage is applied by connecting the turn potentiometer in a bridge circuit with coils TP1 and TP2 similar to the rudder potentiometer and means for trimming this circuit for off balance conditions is had in the rudder trim potentiometer, the movable tap of which adjusts the currents in coils TP1 and TP2 when potentiometer TP is centered to compensate for off center conditions. The course error voltage is applied to coils CU1 and CU2 which produce balanced torques when the craft is on course. While the magnetic effects of coils SV1 and SV2 produce opposed torques about the gyroscope axis due to the fact that they are arranged on oppositely disposed cores. For a given control condition, the M. M. F. of one of these coils always opposes that of one of the coils RP1 or RP2, because the M. M. F.'s of coils RP1 and RP2 are opposed. Thus the polarizing effect of such coils as RP1 and RP2 effects an unbalance of magnet forces and hence, an unbalance of torques about the turn gyroscope output axis due to the velocity feedback voltage.

In the bank gyroscope electromagnet system, the velocity voltage and the bank voltage taken respectively from the pair of bridge circuit terminals T2 and the bank voltage potentiometer BVP are added in series in a circuit including a pair of coils BV1 and BV2. This circuit corresponds to its counterpart in the rudder section of the system. The aileron position voltage is applied by the connection of the aileron potentiometer AP in a bridge circuit with coils AP1 and AP2 in which the movable tap on AP unbalances the coil currents. The M. M. F.'s of the two pairs of coils are related as those of the pair of coils SV1, SV2 and RP1, RP2.

In the pitch gyroscope electromagnet system, the velocity voltage is applied to coils EV1 and EV2 which are connected in series across the terminals T3 of the elevator motor bridge circuit and the elevator position voltage is applied by means of a bridge circuit in which the tapped portions of potentiometer EP form adjacent legs and a pair of coils EP1 and EP2 form the remaining two adjacent legs, the movable tap of EP being connected between the coils EP1 and EP2 to control the current distribution between the coils. Here again, the M. M. F.'s of the coils EV1 and EV2 are in the same direction while the M. M. F.'s of the coils EP1 and EP2 are opposed. Thus for one polarity of terminals T3 the M. M. F. of coil EV2, for instance, opposes that of coil EP2 while the M. M. F. of coil EV1 aids that of coil EP1. When the velocity voltage is reversed and the polarity of terminals T3 is reversed, the M. M. F. of coil EV1 opposes that of coil EP1 while that of coil EV2 aids that of coil EP2. The piloting voltage from the up-elevator potentiometer UEP is applied in a bridge circuit. In this circuit the up-elevator potentiometer forms one leg, having its extremities connected together to form a common terminal. Thus the tapped portions of the potentiometer form parallel resistance branches in the bridge leg in which movement of the movable tap to either side of center position decreases the resistance of the leg to unbalance the bridge circuit. The adjacent leg of the bridge is formed by resistor R7 while the remaining two legs are formed by coils UEP1 and UEP2 and resistor R8 is connected on one side to a point between the pair of coils UEP1 and UEP2 and on its other side to a point between resistor R7 and potentiometer UEP. As previously noted, the resistance of the potentiometer UEP is sufficient with respect to the resistance of the coils UEP1 and UEP2 to provide a flatness of response over the balance point approximating a square-law function to afford the desired up-elevator application for the system. The piloting voltage from the pitch potentiometer is applied by means of a bridge circuit including the tapped portions of pitch potentiometer PP as adjacent legs and the pair of coils PP1 and PP2 as the remaining adjacent legs, the movable tap of potentiometer PP being connected between the coils PP1 and PP2 controls the current distribution in these coils. The vertical rate and vertical position quantity of the vertical rate control VRC is applied to coils VR5 and VR6. These coils are respectively connected in series with contacts VR1 and VR2 and one coil or the other is energized depending upon which of contacts VR1 and VR2 is engaged by the movable contact associated therewith. Since a linear response is here desired, a pair of biasing coils C1 and C2 are applied to the cores carrying the coils VR5 and VR6, coil C1 being on a core with coil VR5 and coil C2 being on a core with coil VR6. Coils C1 and C2 are arranged in series in a circuit across the power supply and produce opposed magnetic forces on the armature of the electromagnet. The magnetic biasing effect of these coils with respect to coils VR5 and VR6 is such as to produce a linear magnet response to the current of coils VR5 and VR6.

Thus it will be observed that the hovering operation of the contacts controlled by the gyroscopes as hereinbefore noted is influenced in each case by a multiplicity of electromagnetic biases which operate in varying degree and at various intervals to produce the required biasing effect on the gyroscopes of the system and if desired contact hovering may be augmented by introducing torsional vibration about the output axis of each gyroscope by introducing a degree of dynamic unbalance in the rotor system of each.

The directivity signal for the turn gyroscope which is taken from the course control unit CU originates in a flux valve FV responsive to the earth's magnetic field and oriented in a predetermined manner in a horizontal plane therein. The output of this unit energizes the coils CU1 and CU2 biasing the turn gyroscope in such a manner to control the aircraft in azimuth that the predetermined orientation of the flux valve is maintained.

The flux valve is a well-known device and includes three magnetic members 10, 11 and 12 displaced by 120° and the assembly is pendulously mounted in a suitable location in the aircraft to be maintained in a horizontal plane. The magnetic members 10, 11 and 12 form a core structure of Y-shaped configuration which is built up of laminations of magnetic material, the laminated assembly being separated in a vertical direction as viewed at the junction of the arms of the Y-shaped core to straddle an exciting coil FV1 of annular form in which the coil axis is vertically disposed. Each arm of the core of the flux valve carries a winding, these being designated FV2, FV3 and FV4 which are linked by the flux of the exciting coil. The relative magnitudes of exciting flux and cross sectional core area at the junction of the core arms are selected so that saturation of the core occurs with each alternation of the flux, producing a condition in the assembly in which the center section of the core functions effectively as a flux valve. When the flux valve is horizontally disposed, the permeability of the three magnetic members is altered by the horizontal component of the earth's magnetic field. Upon excitation of the exciting coil or winding FV1 with a single-phase alternating current as indicated in the drawing by the sinusoidal wave, there is produced in the three secondary windings FV1, FV2 and FV3 a set of voltages having double the applied frequency and unbalanced magnitudes depending upon the direction of the earth's field and such voltages are similar in every respect to single-phase synchro transmitter voltages as the rotor of the synchro is turned.

In developing the output voltage of the flux valve for application to the turn gyroscope, the three secondary windings of the valve are connected to the stator of a synchro control transformer CT in which the rotor is secured against rotation in a predetermined position. The rotor winding of control transformer CT drives an amplifier of a type similar to that containing tube 48 in which the output of the control transformer CT is compared as to phase with a double frequency voltage synchronized with that of the control transformer output voltage and the output of the amplifier, varying in magnitude and direction depending upon the phase error and whether the error is leading or lagging the reference signal, is utilized to energize the coil DG1 which biases the directional gyroscope DG about its horizontal input axis which is normal to the plane of the drawing as viewed.

The directional gyroscope is of the position type, its gimbal mounting also affording freedom of angular motion about a vertical output axis, as viewed. Thus upon excitation of coil DG1 the polarizing effect of the permanent magnet armatures 13 produces a torque about the input axis thereof in a direction corresponding to the polarity of the coil and the gyroscope precesses about its vertical output axis. This precessional response of the directional gyroscope is applied to the rotor of a synchro transmitter ST through a suitable assembly of gears. The rotor winding of device ST is excited by the common supply of alternating current indicated and the stator winding thereof is connected with the stator winding of a synchro unit S which functions selectively as a transformer and a repeater as will be described hereinafter. The rotor winding of synchro unit S is connected across the input terminals of a normally unbalanced bridge circuit including a pair of resistors R6 and the output terminals of this bridge circuit are connected across the primary winding of a transformer TR1 forming the input circuit to an amplifier including tube 48.

Vacuum tube 48 is provided with a pair of plates connected with the positive side of the source voltage (+), the circuit for plate 48a including choke coil 48c and biasing coil CU1 of the turn gyroscope and the circuit for plate 48b including choke coil 48d and the other biasing coil CU2. Choke coils 48c and 48d together with the shunt connected capacitor 48e form a filter network for the plate circuit tending to provide vibrationless biasing control for the turn gyroscope. Suppressor grid 48f is connected to the positive side of the supply source through one blade of switch S4. Control grids 48g and 48h are connected across a bridge network including a potentiometer P4 and the secondary winding of transformer TR1 in such a way that the voltages thereof are varied in opposite directions depending upon the voltage across the secondary winding of transformer TR1. The cathode 48k is connected to the negative side of the source completing the power supply circuit for the tube.

A circuit including the secondary winding of transformer TR2 is connected across the remaining two terminals of the bridge circuit, which terminals are formed by a tap on the secondary winding of transformer TR1 and the adjustable tap of potentiometer P4. A constant bias is applied to the control grids 48g and 48h by connection of the movable tap of potentiometer P4 to the positive side (+) of the source, the adjustment being such as to balance the plate currents of the tubes when the error signal is zero and a reference voltage is obtained by connecting the primary winding of transformer TR2 to the source of alternating-current indicated, providing equal alternating voltage changes on the grids 48g and 48h. This voltage which is synchronized with the error voltage across the transformer TR1, having its origin in the synchro transmitter ST energized from the same source, thus provides a phase reference for the error voltage and the error voltage thus drives one grid more positive as the other is driven less positive affording push-pull operation of tube 48 and coils CU1 and CU2 controlled thereby.

As a rule the range of values of the course error signals from zero error to 180° of error is too great to be conveniently accommodated in the amplifier controlling coils CU1 and CU2 and when the amplifier is adjusted for proper response to errors in the vicinity of zero error the error voltage, for instance, in the neighborhood of 90° predominates the reference voltage and the function of the amplifier deteriorates. Since the correction of the course error need not be proportional to the actual error, and in fact, is preferably made sufficiently small that course error corrections are not readily noticeable, means are herein provided to reduce the error voltage applied to the amplifier as the course error signal increases.

This is accomplished in the provision of a pair of resistors R6 in the normally unbalanced bridge circuit supplied by the rotor winding of synchro unit S. These resistors are of a type in which the resistance thereof to a flow of current decreases as the voltage applied thereacross increases. The bridge circuit is normally unbalanced by the predominating resistance of resistors R6 which are connected in opposite legs of the bridge. Hence, as the voltage applied to the input terminals T4 of the bridge circuit is increased, the voltage across resistors R6 is increased causing a reduction in resistance thereof tending to decrease the unbalance of the bridge and reducing the voltage applied to the primary winding of transformer 49. By this expedient the circuit constants may be chosen so that suitable sensitivity to minor course errors obtains and which functions in effect to suppress the course error signal as the course error increases that the signal does not exceed the range over which the amplifier is operable.

As thus far described, the course control unit functions to produce an error signal representative of the error in heading of the aircraft from a selected course and this signal through the amplifier 48 is applied to the coils CU1 and CU2 to produce the required gyroscopic response and control of the aircraft to move the aircraft and, hence, also the flux valve in azimuth until the error signal drops to zero. As a rule changes in course will be affected by manipulation of the handwheel HW to produce the desired control of the turn gyroscope and turning of the aircraft. However, if desired, changes in course may be made by rotating the control knob 14 which drives the rotor of the synchro unit S. Assuming for simplicity that the error signal at the time of manipulation of the knob 14 is zero, the rotor is moved from its null position and a voltage is induced therein. This set in error signal is, therefore, applied to the turn gyroscope which initiates a control of the craft in azimuth in a direction to reorient the flux valve so that the transmitted flux pattern appearing in the stator of the synchro unit S is rotated to correspond to the new position of the rotor thereof at which time the error signal is again zero.

Since the rate at which the aircraft approaches the new course by this latter method is slow because the control effect of the course control unit on the turn gyroscope is small, the usual method of making a turn is by means of handwheel HW. During a turn so initiated it is desirable to remove the control effect of the course control unit on the turn gyroscope and at the same time the course unit should be readjusted so that upon completion of the turn it is set to control the plane on the new course. This readjustment of the course control unit is made by repositioning the rotor of the synchro unit S as the aircraft is turned so that upon completion of the turn the rotor is set in its null position with respect to the flux pattern of the stator winding of the device.

Means for repositioning the rotor of synchro unit S during manually initiated turns may be of several forms, for instance, a repeater motor may be employed to drive the rotor into correspondence with the flux pattern for the new heading upon completion of the turn. While this is a practical expedient, it involves additional equipment adding weight and complications to the control. It is, therefore, preferred to employ the method illustrated in which the rotor winding is short circuited during a turn and the rotor allowed to rotate freely so that it may function as a repeater motor and follow the rotating electrical field of its stator. At the same time, short circuiting of the rotor winding effectively removes the error voltage from the input network to the amplifier controlling the turn gyroscope coils. Upon completion of the turn, the rotor winding is, therefore, properly oriented with respect to the new heading and may be reconnected to the amplifier controlling the turn gyroscope coils CU1 and CU2 by removal of the closed or short circuit connection.

The means for accomplishing this includes a solenoid type of brake B having a shoe which engages the rotor of synchro unit S. This brake is released by a spring 15 and closed by electromagnetic forces and operates a set of contacts B1 which are closed in the released position of the brake to short the rotor winding of synchro unit S. Since the brake is to be released and the rotor winding of unit S short circuited during a turn means are provided in the form of a switch S5 controlled by handwheel HW to control the supply of energy to the coil of brake B. This switch is of the cam actuated type being closed when the handwheel is centered and opened when the handwheel is rotated in either direction from center to initiate a turn. For fixed course operation, the handwheel is centered and switch S5 is closed energizing the brake B and locking the rotor of synchro unit S. When the brake is in its operative position, the contacts B1 are opened and as a consequence, the signal appearing in the rotor winding of synchro unit S is applied to the amplifier input circuits influencing the control of the plane. To initiate a turn, the handwheel is rotated opening switch S5 and the brake is spring biased to released position closing contacts B1 to short the rotor winding of unit S. As the plane turns the electrical field of the synchro unit and the flux pattern rotates due to the output of the flux valve and the rotor winding rotates therewith repeating the angular position of the plane throughout the turn. When the handwheel is again centered and the brake applied, the rotor is, therefore, oriented for null position with respect to the new course.

As a rule, control of the aircraft during take-off is done under the manual control of the pilot. Once the plane is flying at the proper altitude on the selected course, the control is switched over to the auto pilot for fixed course control. In accomplishing this, the gyroscopes are brought up to operating speed, after which the source voltage may be applied and switches S1, S2 and S3 closed to connect up the drives for the potentiometers RP, AP and EP, respectively, and the associated control surfaces. Brake B remains deenergized, however, until switch S4 is closed, the coil circuit therefor being broken through the righthand blade, as viewed, of S4. Thus at this instant the rotor winding circuit for the synchro unit S is closed through the contacts B1 and the rotor position is synchronized with the voltage pattern of the stator winding thereof transmitted from the flux valve to the mentioned stator winding through the intermediate system elements, which properly orients the rotor for zero voltage output for the selected course. Closure of switch S4 energizes the coil of brake B applying the brake to lock the rotor and removing the short circuit on the rotor winding of unit S at which time a rotor signal voltage may be applied across the input to the amplifier.

The system now functions to maintain the aircraft on the selected course and to this end velocities of motion about any of the three control axes are instantly detected by the gyroscopes. Yawing velocities produce output torques at the turn gyroscope in directions which produce servo mechanism operation to apply the rudder so as to produce opposite yaw velocities. During this interval the velocity feedback voltage and the rudder potentiometer voltage produce electromagnetic biasing torques at the gyroscopes which oppose the precessional torque. The hovering contact condition which results produces an average current in the field of the rudder generator causing rudder movement at a predetermined rate which is a function of the velocity disturbance about the yaw axis. As rudder movement increases, the electromagnetic bias increases, the velocity disturbance decreases and the gyro output torque decreases reducing the output current. At equilibrium the electromagnetic bias opposes and balances the gyro torque output at which point the motor stops and just sufficient current is circulated to maintain the required torque of the motor. At this point, the velocity feedback voltage is zero since the bridge circuit of the motor generator system is balanced. The rudder correction is now maintained for that small interval of time necessary to check the velocity disturbance at which time the gyroscopic response drops to zero with the velocity disturbance and the overbalancing electromagnetic bias produces a reversal of the servo-mechanism causing reverse rudder movement to neutral position. The function of the system in the reverse direction is essentially similar. Cumulative errors in course are detected by the direction indicator and the error signal voltage applied to the input of the amplifier unbalances the currents circulating in coils CU1 and CU2. The unbalance torque about the output or precession axis of the turn gyroscope influences operation of the servomechanism for the rudder in a direction to correct the course error. While the course correction illustrated is continuous, it may, of course, be applied only at intervals to correct a slight cumulative course error.

Operation of the turn gyroscope produces voltages across the bank voltage potentiometer BVP which are applied to coils BV1 and BV2 of the bank gyroscope electromagnet system. Thus upon application of the rudder to check velocities of movement about the turn axis, the bank gyroscope is controlled to produce aileron servomechanism operation in a direction to apply the ailerons in correspondence with the rudder position or direction of movement. This introduces a velocity about the roll axis which is detected by the roll gyroscope which produces an output torque opposing the bank voltage bias and the velocity feedback voltage of the aileron servo system which now supplements the bank voltage signal. As the ailerons are displaced another electromagnetic bias appears which aids the bank voltage and velocity feed bias. This bias is the result of operation of the aileron potentiometer AP which controls the excitation of coils AP1 and AP2. Equilibrium of the ailerons results when the potentiometer AP is suitably displaced to balance the magnetic torques against the gyroscopic and pendulous torques of the bank gyroscope. When equilibrium in the bank angle is reached, the pendulous response of the bank gyroscope produces torques about the output axis thereof tending to center the gyroscope and return the ailerons to streamlined position.

Operation of the bank gyroscope produces a voltage across the skid voltage potentiometer SVP which is applied in series with the velocity feedback voltage of the rudder servo system to the coils SV1 and SV2 of the turn gyroscope electromagnet system. This voltage tends to hold back or suppress rudder application and since the skid voltage diminishes with accumulated bank angle premature rudder application is minimized.

Turns may be executed by the simple expedient of rotating handwheel HW displacing the movable taps of both potentiometers TP and UEP and producing a coordinated unbalance of the electromagnetic biases of the pair of coils TP1, TP2 and UEP1, UEP2. The magnetic torques thus produced cause operation of the pitch and turn gyroscopes in a suitable direction to effect, for example, right rudder and up-elevator corresponding in magnitude to the right rudder application. The gyroscope torques oppose the electromagnetic biases as previously described producing the hovering contact condition and average excitation currents for the elevator and rudder generator fields. Switch S5 is opened by the cam driven by the handwheel and deenergizes the brake B. Simultaneously therewith, the rotor of the synchro unit is unlocked. Thus the rotor circuit is closed and the synchro unit functions as a repeater of the changing course of the aircraft in the turn.

Climbs and dives are executed by actuation of pitch potentiometer PP by handwheel HW connected thereto. Coils PP1 and PP2 under the control of pitch potentiometer PP produce the electromagnetic biasing torques for this operation. The response of the pitch gyroscope and elevator servo-system is similar to that for other of the described operations.

The up-elevator signal on the pitch gyroscope causes up-elevator application to provide the proper pitch velocity for the turn indicated by handwheel rotation. This control is supplemented by the control of the vertical rate system which senses rates of change in altitude as well as displacements. Thus if the asked for pitch velocity set in by the up-elevator potentiometer results in a climb or a dive in the turn, the biasing effect of the vertical rate system on the pitch gyroscope tends to modify the pitch signal to coordinate the pitch velocity with the bank angle and turn rate.

The foregoing disclosure and the showings made in the drawings are merely illustrative of the principles of this invention and are not to be interpreted in a limiting sense. The only limitations are to be determined from the scope of the appended claims.

We claim as our invention:

1. In a system of control for steering an aircraft, the combination of, electro-responsive steering control means for said aircraft, a gyroscope for controlling said steering control means, electrical biasing means for controlling said gyroscope, manually operated means for producing electrical quantities, circuit means connecting said manually operated means to said electrical biasing means for applying said electrical quantities thereto for controlling said gyroscope, a synchro control transformer having a stator winding, a rotor and a rotor winding, a brake for locking said rotor, electromagnetic compass means for producing electrical quantities depending upon the course of travel of said aircraft for energizing said stator winding, circuit means connecting said rotor winding to said electrical biasing means for controlling the gyroscope, and means responsive to operation of said manually operated means for actuating said brake to released position and short circuiting said rotor winding.

2. In a system of control for steering an aircraft having steering control means, the combination of, a gyroscope for controlling the steering control means, manually operated means for controlling the gyroscope, a synchronous transformer having a stator winding, a rotor and a rotor winding, a brake normally locking said rotor, means for energizing the stator winding in dependence of the departure of said aircraft from a predetermined course, means responsive to the electrical output of the rotor winding for controlling the gyroscope, and means responsive to said manually operated means for actuating said brake to unlock said rotor and to short circuit said rotor winding.

3. Apparatus for controlling a body operable in space about an axis of freedom thereof comprising, in combination, a gyroscope having an input torque axis and an output torque axis at right angles to said input torque axis, means securing said gyroscope to said body with said input torque axis paralleling the axis of freedom of said body so that said gyroscope is rotated about said input torque axis upon motion of said body about the axis of freedom thereof, means responsive to torque about the output axis of said gyroscope for controlling said body about the axis of freedom thereof, biasing means for applying torques about the output torque axis of said gyroscope, piloting means for controlling said biasing means, position reference means for controlling said biasing means in dependence of changes in position of said body about the axis of freedom thereof with respect to a reference position, and control means responsive to said piloting means for disconnecting said position reference means from said biasing means.

4. In an automatic pilot for an aircraft, the combination of, gyroscopic means for controlling motion of said aircraft about the turn axis thereof, piloting means for controlling the gyroscopic means, a synchronous transformer having a stator winding, a rotor and a rotor winding, circuit means for energizing said stator winding in dependence of angular deviations of said craft from a given course, circuit means connecting said rotor winding with said gyroscopic means to control the gyroscopic means, a brake normally engaging said rotor, circuit control means for short circuiting said rotor winding, and means responsive to said piloting means for operating said brake to disengage said rotor and operating said circuit control means to short circuit said rotor.

5. In a system of control for an aircraft, the combination of, turn gyroscope means responsive to the velocity of angular movement of the aircraft in azimuth for controlling the aircraft in azimuth, biasing magnets for controlling the turn gyroscope means, compass means for energizing the biasing magnets in dependence of the error in angular position of the aircraft in azimuth with respect to a given reference position, piloting means for energizing the biasing magnets, and means responsive to the piloting means for preventing said compass means from energizing said biasing magnets.

6. In a system of control for an aircraft, the combination of, turn gyroscope means responsive to the velocity of angular movement of the aircraft in azimuth for stabilizing the aircraft in azimuth, biasing magnets for controlling the turn gyroscope, a synchro unit having a stator winding, a rotor and a rotor winding, a flux valve compass, means for energizing said stator winding in dependence of the electrical output of the flux valve compass, circuit means connecting said rotor winding to energize said biasing magnets, a brake engaging said rotor, contact means for short circuiting said rotor winding, piloting means for energizing said biasing magnets, means responsive to said piloting means for operating said brake to disengage said rotor, and means responsive to said piloting means for operating said contact means to short circuit said rotor winding.

7. In a system for controlling an aircraft about the turn axis thereof, the combination of, gyroscopic apparatus responsive to the velocity of motion of the aircraft about said turn axis and having an output torque axis about which torque is produced in response to said velocity of motion, electrical control means responsive to said torque for stabilizing the aircraft about said turn axis, piloting means for applying torques about said output torque axis, compass means for applying torques about said output torque axis, and means responsive to said piloting means for preventing said compass means from applying torques about said output torque axis.

8. In an automatic pilot for an aircraft, means for controlling motion of the aircraft about the turn axis thereof comprising, in combination, a velocity type gyroscope disposed on said aircraft to respond to the velocity of motion of said aircraft about said turn axis and produce precessional torque in dependence of the velocity of said motion, means responsive to said precessional torque for effecting velocity of motion of said aircraft about said turn axis in opposition to the detected velocity of motion, electromagnetic biasing means for the gyroscope for controlling the precessional torque thereof, piloting means for energizing said electromagnetic biasing means, compass means for energizing said electromagnetic biasing means, and means responsive to said piloting means for preventing said compass means from energizing said electromagnetic biasing means.

9. In an automatic pilot for an aircraft, means for controlling motion of the aircraft about the turn axis thereof comprising, in combination, a velocity type gyroscope disposed on said aircraft to respond to the velocity of motion of said aircraft about said turn axis and produce precessional torque in dependence of the velocity of said motion, means responsive to said precessional torque for effecting velocity of motion of said aircraft about said turn axis in opposition to the detected velocity of motion, electromagnetic biasing means for the gyroscope for controlling the precessional torque thereof, piloting means for energizing said electromagnetic biasing means, a synchro unit having a stator winding, a rotor and a rotor winding; means including a flux gate compass for energizing the stator winding, circuit means connecting said rotor winding with said electromagnetic means to energize the electromagnetic means in dependence of the rotor winding output, a brake engaging said rotor to prevent rotation thereof, means responsive to said piloting means for actuating said brake to disengage said rotor, and means responsive to said piloting means for short circuiting said rotor winding.

10. In a steering control for an aircraft, the combination of, a velocity responsive gyroscope disposed to respond to the velocity of motion of said aircraft about the turn axis thereof for controlling said aircraft about said turn axis, a gyroscope stabilized compass including an azimuth directional gyroscope disposed to maintain a fixed position in azimuth, and compass means for controlling said gyroscope; a synchro control transmitter having a stator winding, a rotor and a rotor winding, means connecting said rotor of said synchro control transmitter to be driven by said gyroscope, means for energizing the rotor winding of the synchro control transmitter, a synchro unit having a stator winding, a rotor and a rotor winding; circuit means connecting the stator winding of the synchro control transmitter with the stator winding of the synchro unit to energize the stator winding of the synchro unit, circuit means responsive to the electrical output of the rotor winding of the synchro unit for controlling the velocity responsive gyroscope, piloting means for controlling the velocity responsive gyroscope, and means responsive to said piloting means for short circuiting the rotor winding of the synchro unit.

11. In a steering control for an aircraft, the combination of, a velocity responsive gyroscope disposed to respond to the velocity of motion of said aircraft about the turn axis thereof for controlling said aircraft about said turn axis, a gyroscope stabilized compass including an azimuth gyroscope disposed to maintain a fixed position in azimuth and compass means for controlling said gyroscope, a synchro control transmitter having a stator winding, a rotor and a rotor winding; means connecting said rotor of said synchro control transmitter to be driven by said gyroscope, means for energizing the rotor winding of the synchro unit, a synchro control transformer having a stator winding, a rotor and a rotor winding; circuit means connecting the stator winding of the synchro control transmitter with the stator winding of the synchro unit, and means responsive to the electrical output of the rotor winding of the synchro unit for controlling the velocity responsive gyroscope.

12. In a system of directional control for a craft having steering means, the combination of, an electrically operated servo system for controlling said steering means, circuit means including a normally unbalanced bridge circuit for energizing said servo system, impedance means forming a part of the normally unbalanced bridge circuit for reducing the unbalance thereof as the energization thereof is increased, directional control means, a synchro unit having a stator winding, a rotor and a rotor winding; circuit means connecting said stator winding to said directional control means for energizing the stator winding, circuit means connecting the rotor winding to said normally unbalanced bridge circuit for energizing the normally unbalanced circuit, piloting means for controlling said servo system, and means responsive to said piloting means upon operation thereof for short circuiting said rotor winding to prevent said winding from energizing said normally unbalanced circuit.

13. In a system of directional control for a craft having steering means, the combination of, an electrically operated servo system for controlling said steering means, circuit means including a normally unbalanced bridge circuit for energizing said servo system, impedance means forming a part of the normally unbalanced bridge circuit for reducing the unbalance thereof as the energization thereof is increased, directional control means, a synchro unit having a stator winding, a rotor and a rotor winding; circuit means connecting said stator winding to said directional control means for energizing the stator winding, circuit means connecting the rotor winding to said normally unbalanced bridge circuit for energizing the normally unbalanced bridge circuit, an electrically operated brake for locking said rotor, resilient means biasing said brake to released position, switching means for short circuiting said rotor winding, piloting means for controlling said servo system, said piloting means normally occupying a neutral position and being movable in each of two directions from said neutral position, circuit means operated by said piloting means for energizing said electrically operated brake and operating said switching means, said brake being energized and said switching means opened when said piloting means is in neutral position and said brake being deenergized and said switching means closed when said piloting means is moved in either of said two directions from neutral position.

14. In a system of directional control for craft having steering means, the combination of, an electrically operated servo system for controlling said steering means, circuit means including a normally unbalanced bridge circuit for energizing said servo system, impedance means forming a part of the normally unbalanced bridge circuit for reducing the unbalance thereof as the energization thereof is increased, directional control means, a synchro unit having a stator winding, a rotor and a rotor winding; circuit means connecting said stator winding to said directional control means for energizing the stator winding, circuit means connecting the rotor winding to said normally unbalanced bridge circuit for energizing the normally unbalanced bridge circuit, an electric brake for locking said rotor, resilient means biasing said brake to released position, a switch actuated by said brake, said switch being closed when said brake is in released position, circuit means connecting said switch across said rotor winding, piloting means for controlling said servo system, said piloting means normally occupying a neutral position and being movable in each of two directions from said neutral position, switching means operated by said piloting means, said switching means being closed when said piloting means is in neutral position, and circuit means connecting said switching means to energize said electric brake.

15. In a system for controlling a body about an axis of freedom thereof, the combination of, electro-responsive control means for moving said body about said axis, means forming a reference position for said body about said axis, means for producing a position error voltage in dependence of the angular position of said body about said axis with respect to said reference position, circuit means including a normally electrically unbalanced bridge circuit for energizing said electro-responsive control means, circuit means for applying said position error voltage to said normally electrically unbalanced bridge circuit to effect energization thereof, and impedance circuit means forming a part of said normally electrically unbalanced bridge circuit responsive to said position error voltage for reducing the electrical unbalance as the applied position error voltage increases.

16. In a system of directional control for a craft having steering means, the combination of, an electrically controlled servo system for operating the steering means, circuit means including a normally unbalanced bridge circuit for energizing the servo system, directional control means for energizing said normally unbalanced bridge circuit in dependence of the error in heading of said craft, and bridge circuit means forming a part of said normally unbalanced circuit for reducing the unbalance thereof as the energization thereof is increased.

17. In a system of directional control for a craft having steering means, the combination of, an electrically controlled servo system for operating the steering means, circuit means including a normally unbalanced bridge circuit for energizing the servo system, directional control means for energizing said normally unbalanced bridge circuit in dependence of the error in heading of said craft, impedance circuit means forming a part of said normally unbalanced bridge circuit for reducing the unbalance thereof as the energization thereof is increased, piloting means for controlling said servo system, and means responsive to said piloting means for preventing said directional control means from energizing said normally unbalanced bridge circuit.

18. In a flight controller for dirigible craft, the combination of, a movable control member, gyroscope means for controlling the flight of said craft, electrically controlled biasing means connected with the gyroscope means for controlling the gyroscope means, a course indicating unit comprising a stator, a stator winding, a rotor and a rotor winding circuit; circuit means connecting said rotor winding circuit to said biasing means to control said biasing means, switch means for electrically closing the rotor winding circuit, circuit connections for applying a course indicating electrical signal to said stator winding, means responsive to movement of said control member for closing said switch means, an electrical means responsive to movement of said control member and connected to said biasing means to control said biasing means.

19. In a flight controller for dirigible craft, the combination of, a movable control member, gyroscope means for controlling the flight of said craft, electrically controlled biasing means connected with said gyroscope means to control said gyroscope means, a course indicating unit comprising a stator, a stator winding, a rotor and a rotor winding circuit; switch circuit means connecting said rotor winding circuit to said biasing means to energize said biasing means, means for electrically closing said rotor winding circuit, circuit connections for applying course indicating electrical signals to said stator winding, a brake for locking said rotor, and means controlled by said movable control member for operating both the brake and the switch means, and electrical means responsive to movement of said control member and connected to said biasing means for controlling said biasing means.

20. In a directional control for a dirigible craft having electrically controlled steering means for controlling said craft about the turn axis thereof, the combination of, a rate gyroscope having a degree of freedom about an output torque axis thereof, means for mounting said gyroscope on said craft to be subject to angular movement of said craft about said turn axis and produce output torque about said output axis, circuit means responsive to said output torque for controlling the electrically controlled steering means, electrically controlled biasing means connected with said gyroscope for biasing said gyroscope about the output torque axis thereof, directional control means for producing electrical quantities in dependence of a difference in heading of said craft with respect to a predetermined heading, and circuit means connecting said directional control means with said electrically controlled biasing means.

21. In a directional control for a dirigible craft having electrically controlled steering means for controlling said craft about the turn axis thereof, the combination of, a rate gyroscope having a degree of freedom about an output torque axis thereof, means for mounting said gyroscope on said craft to be subject to angular movement of said craft about said turn axis and produce output torque about said output axis, circuit means responsive to said output torque for controlling the electrically controlled steering means, electrically controlled biasing means connected with said gyroscope for biasing said gyroscope about the output torque axis thereof, directional control means for producing electrical quantities in dependence of a difference in heading of said craft with respect to a predetermined heading, circuit means connecting said directional control means with said electrically controlled biasing means, and electrical means forming a part of said circuit means and responsive to the magnitude of said electrical quantity for diminishing said electrical quantity.

22. In a directional control for a dirigible craft having electrically controlled steering means for controlling said craft about the turn axis thereof, the combination of, a rate gyroscope having a degree of freedom about an output torque axis thereof, means for mounting said gyroscope on said craft to be subject to angular movement of said craft about said turn axis and produce output torque about said output axis, circuit means responsive to said output torque for controlling the electrically controlled steering means, electrically controlled biasing means connected with said gyroscope for biasing said gyroscope about the output torque axis thereof, directional control means for producing electrical quantities in dependence of a difference in heading of said craft with respect to a predetermined heading, a normally unbalanced electrical circuit connecting said directional control means with said electrically controlled biasing means, and resistor means, the resistance of which varies inversely with the voltage applied thereto, connected in said normally unbalanced electrical circuit to diminish the unbalance thereof with increasing magnitudes of said electrical quantity.

23. In a gyroscope control, the combination of, a gyroscope assembly having a frame structure providing an input axis, an output axis and a rotor spin axis, electrically operated biasing means connected to said frame structure for applying torques about said output axis, electrical means connected with said biasing means for applying electrical control signals to said biasing means, a movable controller for applying electrical control signals to said biasing means, and circuit means operated by said movable controller upon movement thereof for effectively disconnecting said electrical means from said biasing means.

24. In a controller for effecting angular movement of a moving craft having servo means for causing torques to be imposed on said craft about a given axis and having directivity means responsive angular heading of said craft, the combination of, gyro means responsive to angular velocity of the craft about the given axis, biasing means associated with said gyro means for imposing torques thereon, a movable control member, and control means responsive to the movable control member for selectively connecting said biasing means to said directivity means and to said movable control member.

25. Apparatus for controlling a body in space about an axis of freedom thereof comprising, in combination, a gyroscope having an input torque axis and an output torque axis at right angles to said input torque axis, means securing said gyroscope to said body with said input torque axis paralleling the axis of freedom of said body so that said gyroscope is rotated about said input torque axis upon motion of said body about the axis of freedom thereof, servo means responsive to torque about the output axis of said gyroscope for applying torques about the axis of freedom of said body in a direction opposite to the torque applied by the body about the input torque axis of said gyroscope, biasing means for applying torques about the output torque axis of said gyroscope, piloting means normally occupying a given position and operable from said given position to control said biasing means, circuit means responsive to the error in angular position of said body about the axis of freedom thereof with respect to a predetermined angular position, for controlling said biasing means, and means responsive to operation of said piloting means from said given position for removing the influence of said circuit means on said biasing means.

IVAR M. HOLLIDAY.
GEORGE R. DOUGLAS.
CLINTON R. HANNA.

References Cited in the file of this patent

UNITED STATES PATENTS

| Number | Name | Date |
|---|---|---|
| 1,966,170 | Greene | July 10, 1934 |
| 2,014,825 | Watson | Sept. 17, 1935 |
| 2,203,671 | Carlson | June 11, 1940 |
| 2,415,430 | Frische et al. | Feb. 11, 1947 |
| 2,442,116 | Carlson | May 25, 1948 |
| 2,464,629 | Young | Mar. 15, 1949 |
| 2,471,821 | Kutzler et al. | May 31, 1949 |
| 2,513,120 | Turner | June 27, 1950 |
| 2,516,796 | Noxon et al. | July 25, 1950 |
| 2,539,411 | Esval et al. | Jan. 30, 1951 |
| 2,611,559 | Meredith | Sept. 23, 1952 |